US005157299A

United States Patent [19]

Gerlach

[11] Patent Number: 5,157,299

[45] Date of Patent: Oct. 20, 1992

[54] FLAT COMMUTATOR AND METHOD FOR ITS PRODUCTION

[75] Inventor: Karl-Heinz Gerlach, Ehningen, Fed. Rep. of Germany

[73] Assignee: Kautt & Bux KG, Fed. Rep. of Germany

[21] Appl. No.: 755,044

[22] Filed: Sep. 5, 1991

[30] Foreign Application Priority Data

Sep. 7, 1990 [DE] Fed. Rep. of Germany ....... 4028420

[51] Int. Cl.$^5$ ............ H02K 13/04

[52] U.S. Cl. ............ 310/237; 310/42; 310/43; 310/234; 310/235

[58] Field of Search ............ 310/233, 234, 235, 237, 310/42, 43; 29/597

[56] References Cited

U.S. PATENT DOCUMENTS 1,811,180 6/1931 Landers ............ 310/237
3,861,027 1/1975 Allen ............ 29/597
4,358,319 11/1982 Yoshida ............ 310/233
4,399,383 8/1983 Kamiyama ............ 310/233

FOREIGN PATENT DOCUMENTS 0021891 1/1981 European Pat. Off. ............ 310/237
8907045 12/1989 Fed. Rep. of Germany .
8908077 12/1989 Fed. Rep. of Germany .
2633781 1/1990 France ............ 310/237
0400944 10/1973 U.S.S.R. ............ 310/237

*Primary Examiner*—R. Skudy
*Attorney, Agent, or Firm*—Wigman & Cohen

[57] ABSTRACT

A flat commutator is described with carbon segments, metal segment-supporting parts supporting these and a hub body of an electrically insulating moldable plastic compound, which supports the segment-supporting parts, a solder layer is provided lying between the two segments for the connection between the carbon segments and the segment-supporting parts. The side surfaces of directly adjacent carbon segment-supporting parts which are facing one another are covered completely by the moldable plastic compound of the hub body. The method for producing this commutator is also described wherein the segment-supporting parts are soldered together with an annular plate later forming the carbon segments before the hub body is fitted onto the segment-supporting parts. The intermediate spaces between the segment-supporting parts are filled with moldable plastic material. Not until after the fitting is the annular plate subdivided into the individual carbon segments.

19 Claims, 9 Drawing Sheets 103
109
109'
109"
105
104
111
102
101
108
102"

109"
104
109'
102
101

109
104
109'
109"
104

2'
2
4
2
3
1
6
1

2'
4
2
3
1
6

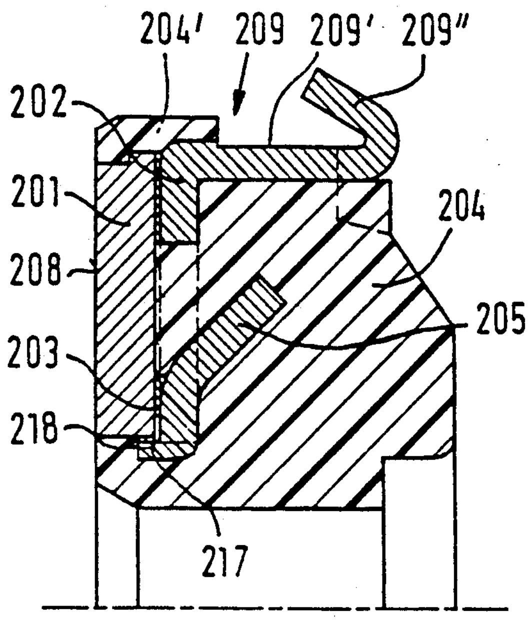
Fig.20
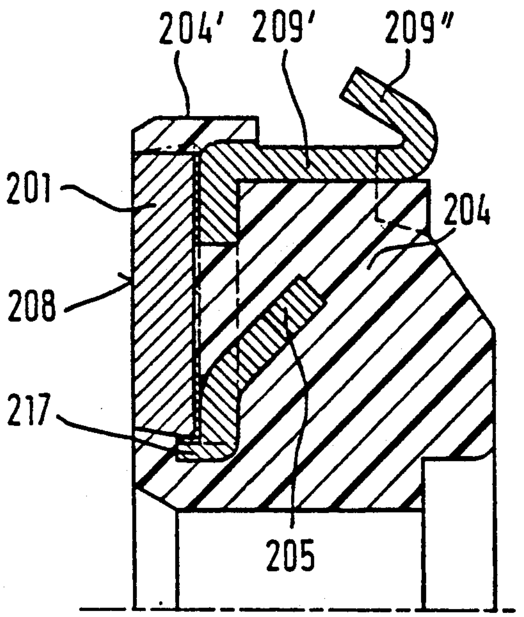
Fig.21
Fig.22
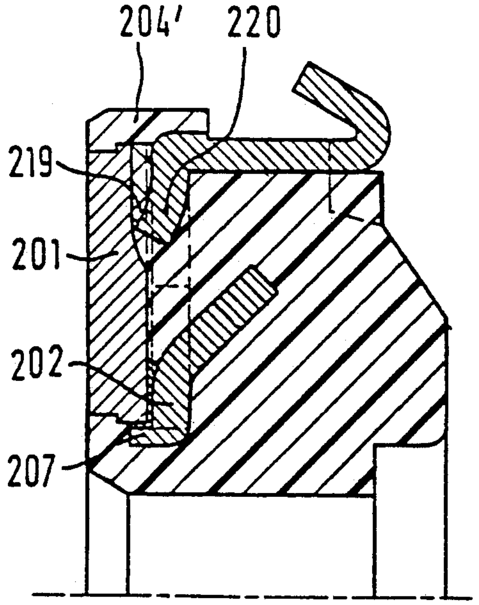
Fig.23
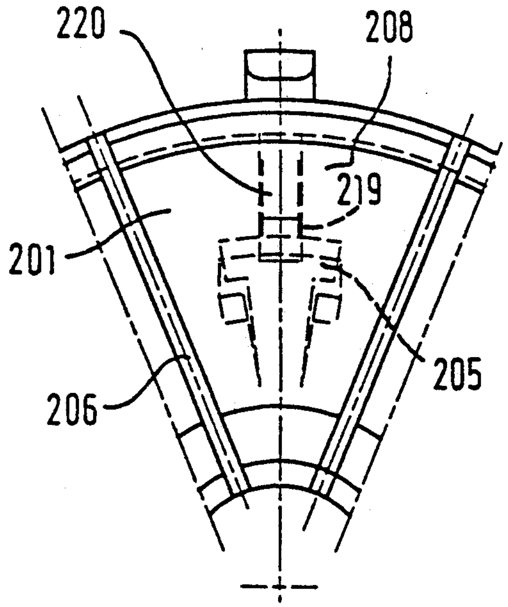

FLAT COMMUTATOR AND METHOD FOR ITS PRODUCTION

BACKGROUND OF THE INVENTION

1. Field of the Invention

The invention relates to a flat commutator and to a method for the production of a flat commutator. More particularly, the present invention utilizes conductive carbon elements and is especially useful in environments which are corrosive to copper.

2. Description of the Prior Art

It is already known to construct brush contact surfaces of commutators of carbon segments when said switches operate in an environment corrosive to copper, such as, a fuel which includes methanol.

German Utility Patent 89 07 045 discloses a flat commutator of the aforementioned type wherein the carbon segments have journals on their bottoms which penetrate through openings in the segment-supporting parts which are of copper and which support them and engage in the hub body which supports the segment-supporting parts anchored in said body, which are separated from one another by separation gaps.

In another known flat commutator intended for operation in an environment reacting with copper (German Utility Patent 89 08 077.7), the segments forming the brush contact surfaces are of a composite material; carbon on the side forming the contact surface; and, metal and plastic on the side turned toward the carbon segment-supporting part which is soldered thereto. The carbon segment-supporting part, is in turn connected securely with a hub consisting of a molded plastic material.

There is no need for concern about extensive wear or abrasion occurring in the area of the brush contact surfaces of these types of switches. Despite the presence of the carbon segments, however, large areas of the segment-supporting parts are exposed to the influence of the aggressive environment. Therefore, until this invention this has been taken into consideration at some cost, since it is not possible to provide all of these areas with protective covering following completion of the manufacture of the commutator. This is especially true for the side surfaces of directly adjacent carbon segment-supporting parts which are turned toward one another. In known commutators the side surfaces of the carbon segments define air gaps on account of the separating of the parts. Another drawback of prior art devices is that because of the journals on the carbon segments, which necessitate undertaking the pressing of the carbon segments on the segment-supporting parts, the manufacturing process is completed only with great difficulty and the formation of a good contact between the carbon segments and the segment-supporting parts supporting them is not permanently guaranteed.

OBJECTS AND SUMMARY OF THE INVENTION

A principal object of the present invention is to provide a commutator which can be operated even in a strongly aggressive or corrosive medium, especially in a fuel with very high methanol content.

Another object of the present invention is to provide a commutator with carbon segments which will not easily wear down, thus attaining high durability of these parts, while they can still be produced economically.

Other objects and advantages will become apparent from a reading of the description and claims which follow.

According to the present invention, the side surfaces of directly adjacent carbon segment-supporting parts face one another and are covered completely by the moldable plastic compound constituent of the hub body. Thus, no excavation of the material of the segment-supporting parts can occur in this area and care need be taken only that the other areas of the segment-supporting parts which are covered neither by the carbon segments nor by the hub bodies are protected from contact with the aggressive environment. Such protection can be attained for instance by coating the surface with a resistant metal or a plastic. Furthermore, in the case of the commutator according to the invention a connection yielding a safe and efficient electrical contact between the carbon segments and the segment-supporting parts is guaranteed, since these parts are connected with one another by a solder layer. The soldering also leads to the possiblity of lower-cost manufacture.

In one of the preferred embodiments, even the end surface of each carbon segment-supporting part which is turned toward the hub borehole, and preferably also its outside end surface which is at a distance from the hub borehole, is completely covered by the moldable plastic material used for the hub body. For even greater protection against penetration of aggresive fluids (gases or liquids), the inside and outside end surface of each carbon segment may be covered or coated at least partially with the moldable plastic of the hub body. It is also possible with this arrangement to realize a direct connection between the carbon segments and the hub body.

It is especially advantageous for the intermediate clearance between two directly adjacent carbon segment-supporting parts to be greater than the width of the air gap aligned with this intermediate clearance, the air gap being between the carbon segments supported by the relevant segment-supporting parts, because then the cutting lines for the formation of the air gaps are limited at their base by the moldable plastic of the hub body which therefore can lead to no contact whatsoever between the separating tool and the carbon segment-supporting parts.

Preferably each carbon segment is connected in a form-locking manner in the radial direction and/or in the direction of rotation form-locking with the segment-supporting part which is supporting it. Such a connection for positioning of the carbon segments before the soldering process is advantageous and also supports the fact that the position of the carbon segments during welding of the coil ends with the attachment elements of the segment-supporting parts is then not modified even in the case wherein the heat thus fed to the segment-supporting parts would lead to a melting of the solder layer. Such a melting would be possible if soft soldering rather than hard soldering is used. To secure the carbon segments, especially in the case of welding the coil ends together with the connection elements, a form-locking connection with the hub body can also be provided. The carbon segments can thus be supported radially by means of an outside supporting surface or even an inside supporting surface. As a result of corrugations or toothed material parts which mesh into one another projecting from the carbon segments and from the material of the carbon segment-supporting parts and/or the hub body engaging on their end surfaces, it can be attained in a simple manner that the carbon segments cannot slide in the direction of rotation of the commutator relative to the segment-supporting parts. Moving in the axial direction can also be prevented with these means, and these means also prevent the moldable plastic of the hub body from encroaching upon the stepped border areas of the carbon segments.

In another embodiment, the connecting elements which connection the carbon segment-supporting parts with the coil ends are produced in the form of a hooked catch member. The hooked catch member base part extends in an axial direction and is attached to the outside edge of the segment-supporting part. These hooked catch member base parts can be configured over a considerable part of their axial lengths in the circumferential direction to be broader than the free hooked catch member ends which are to be attached. By this construction the hooked members have a greater heat capacity, which in the case of soft soldering, and in the case of welding of the coil to the free hooked catch member end, contributes to preventing softening of the solder which connects the carbon segment with the segment-supporting part.

The axially aligned hooked catch member base parts are preferably embedded in the hub body and form together with this body a cylindrical surface. Following assembly of the commutator and production of the connection with the coil ends with a plastic layer this cylindrical surface can be covered over with a plastic layer which also surrounds the coil attaching to the commutator.

By use of the aforementioned features, an improved method for advantageous production of the commutator is able to be utilized.

With conventional commutators which included carbon segments adjacent to the segment-supporting parts connected with the hub body, it was necessary to have the carbon segments mounted on the segment-supporting parts after having connected the segment-supporting parts with the hub body. With the present invention an annular plate of carbon is first soldered onto the segment-supporting parts which are at that point still held together by connecting rods. This procedure causes no difficulties in filling the intermediate clearance between the segment-supporting parts with the moldable plastic which forms the hub body, because for this purpose the hub body need only be fitted onto the single structure consisting of the annular carbon plate and the carbon segment-supporting parts. Thus, the moldable plastic presses forward into the annular plate of carbon and fills up the intermediate clearances between carbon segment-supporting parts.

It is a particular feature, then, that when the annular carbon plate is soldered onto the segment-supporting parts by means of a hard solder which preferably has a low melting point, the connecting parts which are still holding the segment-supporting parts together are then removed, directly following hardening of the solder on the carbon segment-supporting parts which are still hot. The stresses which are building up on account of the different heat expansion coefficients of copper and carbon during the cooling period are thus considerably reduced.

BRIEF DESCRIPTION OF THE DRAWINGS

The present invention is to be explained in greater detail hereinafter relative to the exemplary embodiments shown in the drawings. In the drawings, in enlarged scale:

FIG. 20 is a partially represented longitudinal section of a first modification of the third embodiment;

FIG. 21 is a partial representation of a longitudinal section of a second modification of the third exemplary embodiment;

FIG. 22 is a part representation of a longitudinal section of a third modification of the third embodiment;

FIG. 23 is a partially represented plan view of the working surface of the exemplary embodiment according to FIG. 22, forming the brush contact surface;

DETAILED DESCRIPTION OF THE PREFERRED EMBODIMENTS

Figure 1:
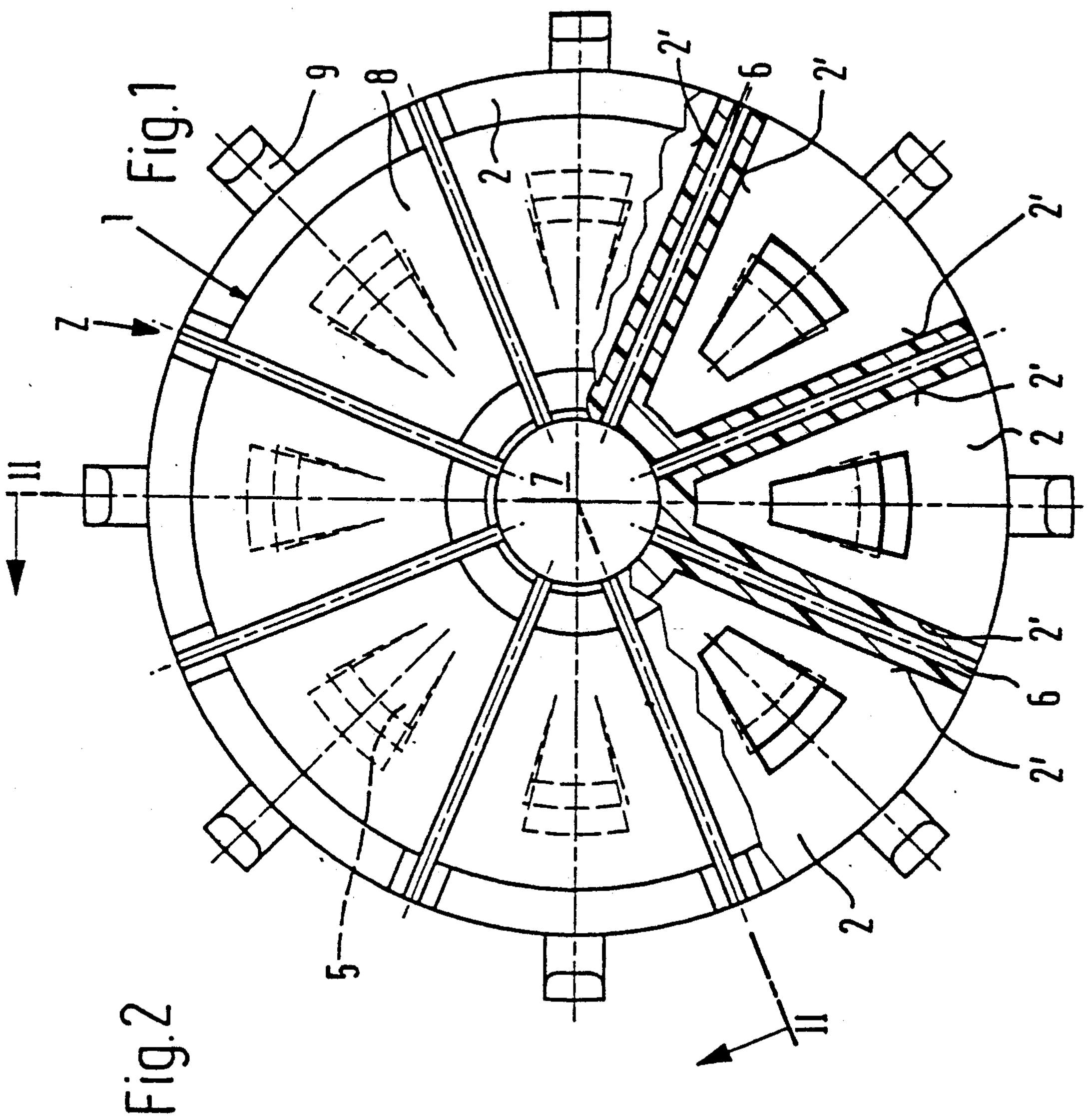
FIG. 1 is a plan view, partially sectioned to show the working surface of a first exemplary embodiment of the commutator incorporating brush contact surfaces according to the invention.
Figure 2:
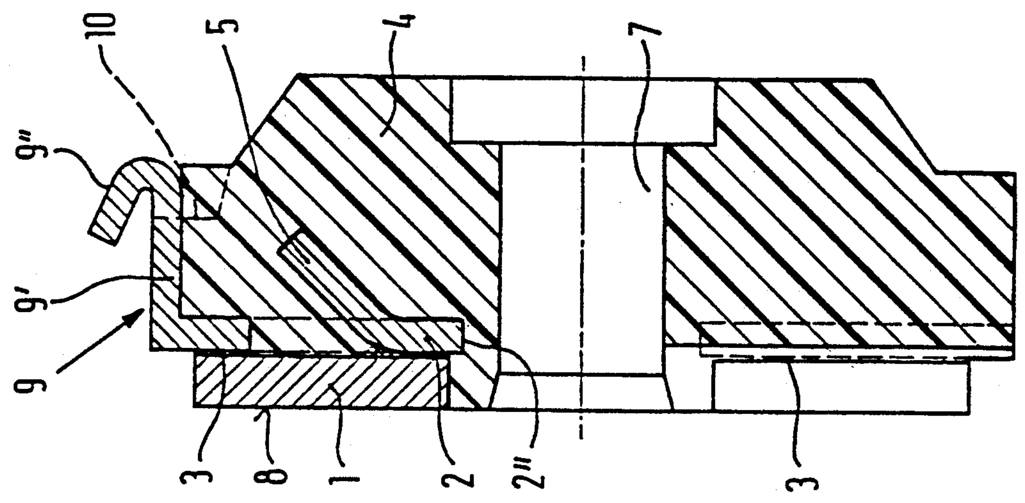
FIG. 2 is a cross section taken along line II—II of the embodiment FIG. 1.

Referring now to the drawings wherein like numerals indicate like elements throughout the several views, there is shown in FIGS. 1 and 2 a flat commutator for a rotor capable of operating in an aggressive environment, especially a rotor of a fuel injection pump with fuel flowing through it which includes a brush contact surface formed by carbon segments 1. Each carbon segment 1 is supported by a carbon segment-supporting part 2 of copper or a copper alloy and is soldered together with this segment-supporting part. The solder layer 3 is formed by the solder which is preferably a silver solder with a melting temperature range between 630° and 650° C. Segment-supporting parts 2 engage with their reverse sides turned away from carbon segments 1 of a fitted hub body 4, formed of a moldable plastic. The attachment between carbon segment-supporting parts 2 and hub body 4 is improved by an anchoring element 5 incorporated in each part 2, which is cut out of segment support part 3 and is flexed outward so that it projects into hub body 4 and is completely embedded therein. As is shown in FIG. 2, anchoring element 5 has the shape of a tongue projecting radially outward and extending into hub body 4, and this tongue widens toward its free end.

The moldable plastic forming hub body 4 completely fills the intermediate clearance between side surfaces 2' of segment-supporting parts 2 turned toward one another, so that all facing side surfaces 2' of directly adjacent segment-supporting parts 2 are completely covered by moldable plastic forming hub 4. As shown in FIG. 1, the distance between side surfaces 2' is considerably greater than the width of the air gap 6 situated in the middle of the intermediate space between side surfaces 2' which separates the directly adjacent carbon segments 1 from one another.

As shown in FIG. 2, segment-supporting parts 2 project radially inwardly beyond carbon segments 1. The moldable plastic of hub body 4, of which the central borehole 7 has a smaller diameter than the cylinder surface defined by the inside end surfaces 2'' of segment-supporting parts 2, completely covers these inside end surfaces 2'' and extends as far as the brush contact surface 8 formed by carbon segments 1, whereupon the end segments of segment-supporting parts 2 facing inward are overlapped and the inside end surfaces of carbon segments 1 are completely protected by the moldable plastic.

Figures 3, 4, 5, 6, 7:
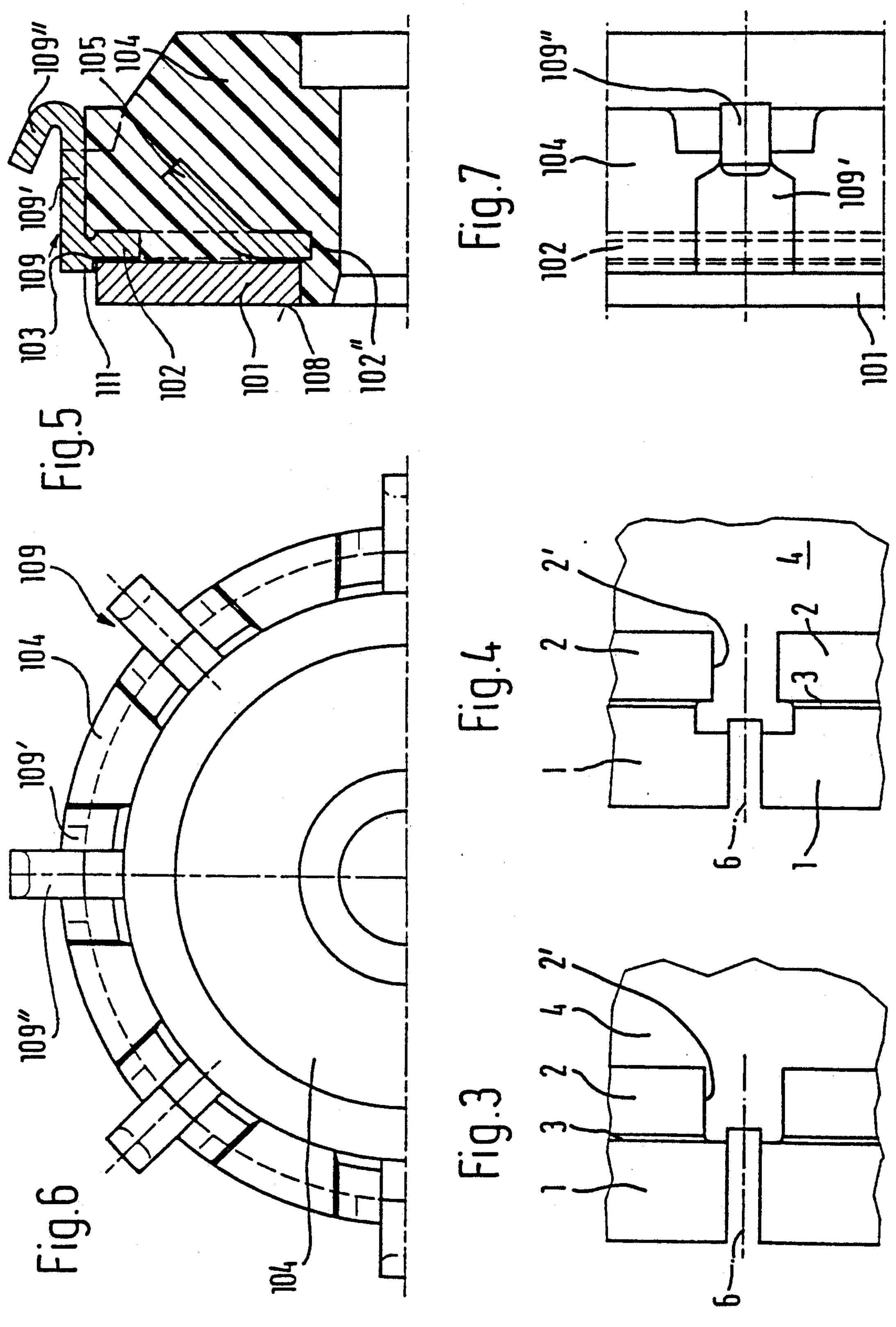
FIG. 3 is an enlarged side view in the direction of arrow Z of a portion of the first exemplary embodiment of FIG. 1.
FIG. 4 is an enlarged view corresponding to that of FIG. 3 of a modification of the first embodiment of FIG. 1.
FIG. 5 is a partial lengthwise section of a second exemplary embodiment of the present invention.
FIG. 6 is a partially represented plan view of the rear surface of the second embodiment of the present invention turned away from the working surface of the carbon segment.
FIG. 7 is a side view of the second embodiment of the present invention which corresponds to the view of FIG. 3.

As shown in FIG. 3, each air gap 6 penetrates slightly into the moldable plastic filling the intermediate clearance between side surfaces 2' of segment-supporting parts 2.

In FIGS. 1 and 2, segment-supporting parts 2 project radially over carbon segments 1 and in this area each has a hooked attachment catch 9, with which is connected the associated coil end, preferably by welding. Each attachment catch 9 has a hooked catch member base part 9' running axially and engaging on the outside cover surface of hub body 4, to which is attached the free hooked catch member end 9'' which projects outward. In the area of the transition of hooked catch member base part 9' to free hooked catch member end 9'', hub body 4 has a recess 10.

The commutator of the present invention is produced in such a manner that on a semifinished plate stamped out of a flat copper strip, the plate consisting of the segment-supporting parts 2, soldering lugs projecting radially outwardly from these for the formation of the hooked attachment catches 9 and the connection parts connection segment-supporting parts 2 on the inside edge, following the bending of the soldering lugs in the axial direction, an annular plate of carbon which has already been metal-coated in a known manner on the solder side before the soldering is soldered on in the center.

Following this soldering process the connecting parts are removed, so that the segment-supporting parts 2 are then held in their positions only by their connection with the annular plate. Then hub body 4 is fitted thereon. As the next steps, the brush contact surface is turned by means of a lathe, if necessary and the free hooked catch member ends are formed. Further individual features of the production are disclosed in the explanations relating to the exemplary embodiments described hereinafter.

In all of the embodiments described herein it is advantageous to select the distance between adjacent carbon segments 1 in an area directly adjacent to segment-supporting parts 2 to be greater than the air gap 6, as is shown in FIG. 4. The moldable plastic of hub body 4 can then also overlap segment-supporting parts 2 in areas adjoining the side surfaces 2'.

The second exemplary embodiment of the commutator according to the invention, shown in FIGS. 5 to 11, of which the preferred range of use is identical to that of the first embodiment, differs from the first embodiment essentially only in that carbon segments 101 are connected in radially outward pointing direction, form-locking with the segment-supporting parts 102 which support them. Corresponding parts are therefore indicated with the same references with 100 added to the reference numbers. As shown for instance in FIG. 5, the edge area projecting radially outward over carbon segment 101 is not only attached to the hooked catch member base part 109'. In addition in this case an annular member portion 111 is also being adapted to the configuration, which stands out over the side of segment-supporting part 102 supporting carbon segment 101 and thus overlaps carbon segment 101 on the outside. The solder layer 103 between segment-supporting part 102 and carbon segment 101 may also extend over the inside surface of annular member portion 111, as far as a solder connection is desired between annular member portion 111 and carbon segment 101.

Figure 8:
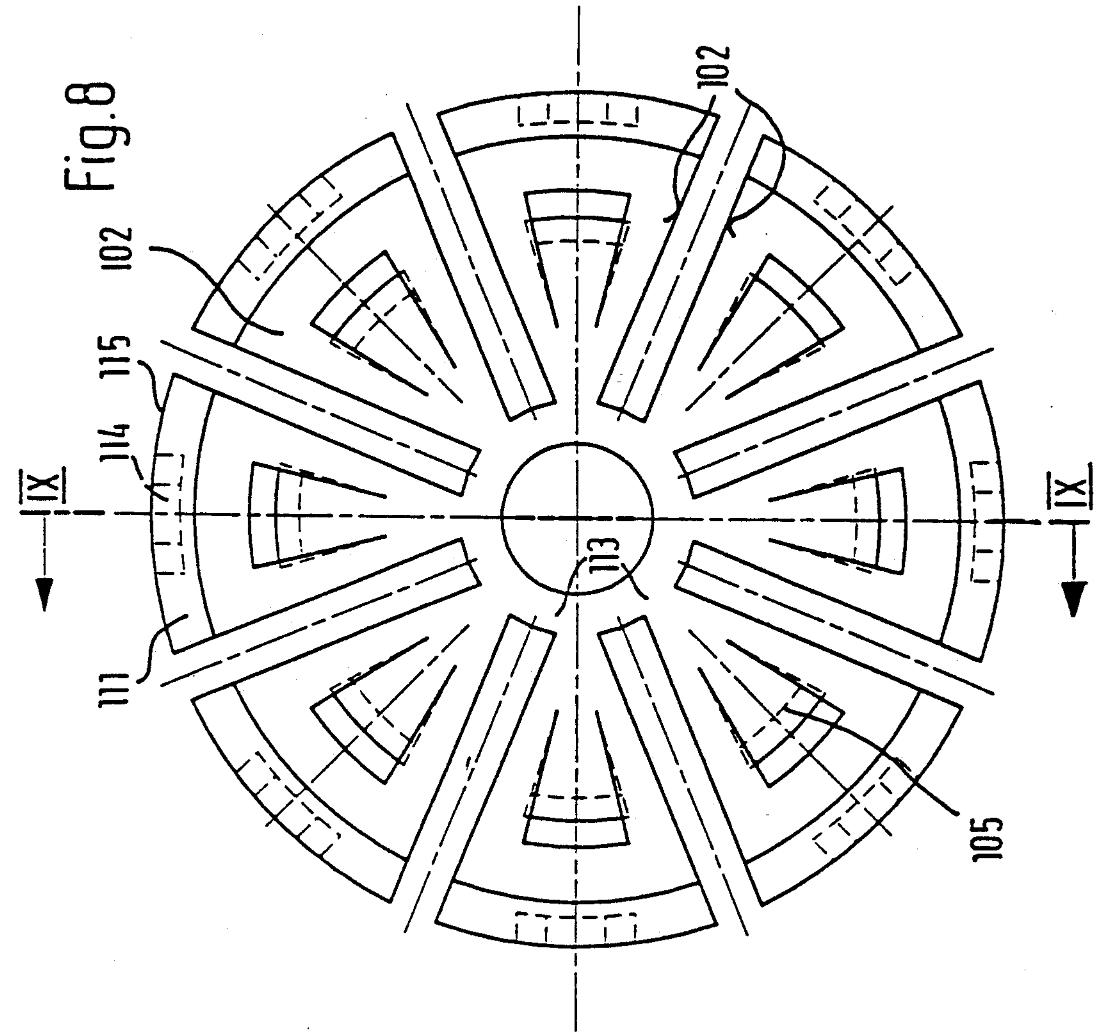
FIG. 8 is a plan view of the body of the second embodiment forming the carbon segment-supporting parts.
Figure 9:
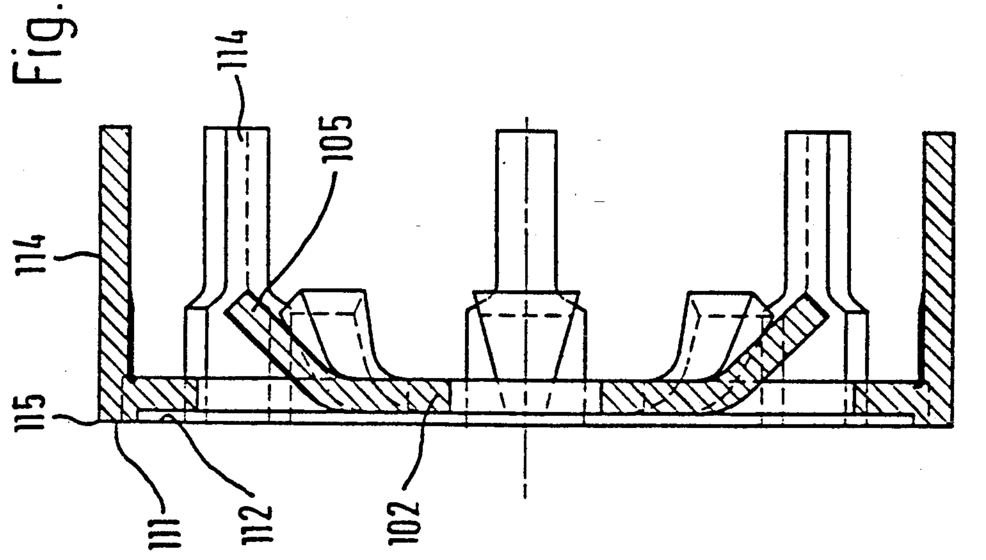
FIG. 9 is a cross section taken along line IX—IX of FIG. 8.

During manufacture, the body forming segment-supporting parts 102 is punched out of a copper strip by first impressing a central circular surface 112 in the strip to form annular member portion 111, before the semifinished plate is punched out. After this punching out process segment-supporting parts 102 remain connected with one another at their inside ends only by connecting parts 113 which form a circle in the center as shown in FIG. 8. During the punching out process the anchoring elements 105 are cut free and flexed outward. Then the soldering lugs 114 which were originally extending radially outward from segment-supporting parts 102 are bent into an axial arrangement. The diameter defined by the outside ends of soldering lugs 114 is still somewhat larger than the final outside diameter. The reason for this is that during this bending process the desired final outside edge 115 cannot be formed as will be required during the subsequent overall spraying of the commutator and the rotor for packing in the casting mold. Thus, after soldering lugs 114 are bent over by means of a drawing tool, which here is guided over these lugs and outward from the free end of soldering lug 114, the outside diameter is brought to the desired value by material displacement in axial direction, and the outside edge 115 takes its shape simultaneously.

A thin soldering plate is now located on the circular surface 112, of a silver solder which melts at a temperature of 630° to 650° C., and an annular plate 116 of carbon is applied to this soldering plate for subsequent soldering, for instance in the furnace. Annular member portions 111 center the soldering plate and annular plate 116. The solder layer producing the connection is indicated with reference 103. Directly following solidification of the solder, while the segment-supporting parts 102 and annular plate 116 are still in hot state, the connecting rods 113 are removed. This operation prevents the build-up of stresses during cooling despite different heat expansion coefficients of copper and carbon.

Figure 11:
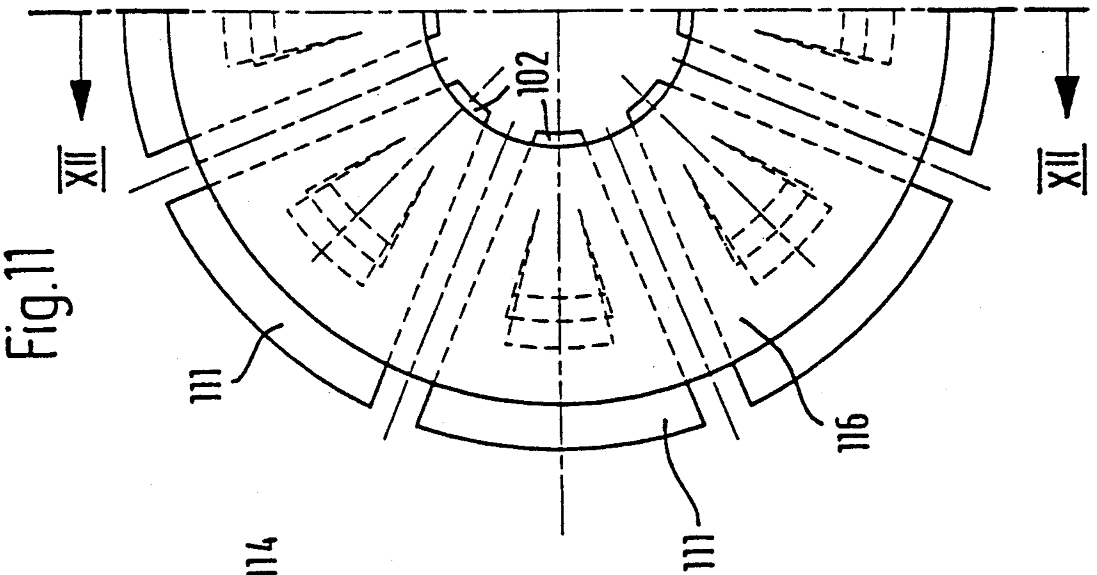
FIG. 11 is a partially represented plan view of the front surface of the member shown in FIG. 10 and the annular plate of carbon which is arranged on this member.
Figure 12:
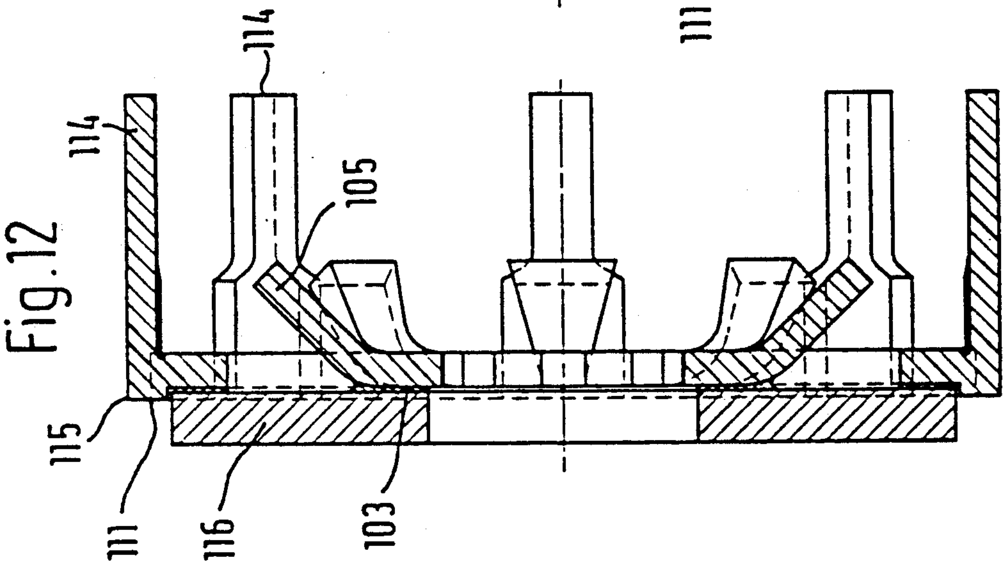
FIG. 12 is a cross section taken along line XII—XII of FIG. 11.
Figure 10:
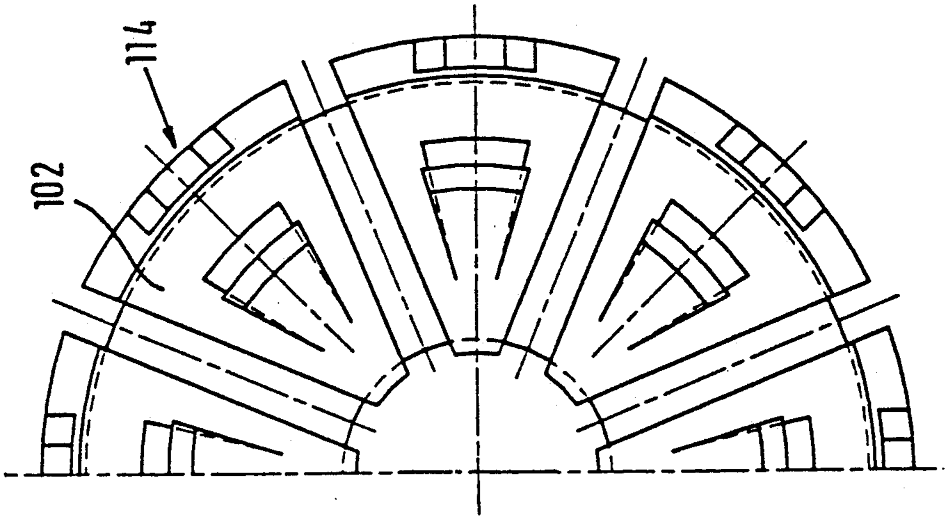
FIG. 10 is a partially represented plan view of the reverse side or side turned towards the hub body of the segment-supporting parts and the annular carbon plate which is soldered with the segment-supporting parts turned toward the hub body following removal of the connecting parts.

The structure shown in FIGS. 10 to 12, consisting of segment-supporting parts 102 separated from on another and annular plate 116, is introduced into a mold in which hub body 104 is formed and is fitted on segment-supporting parts 102, and the intermediate space between the side surfaces 102' of segment-supporting parts 102 turned facing one another is completely filled with moldable plastic. Also its inside end surface 102'', as shown in FIG. 5, are coated with moldable plastic which extends as far as the plane defined by brush contact surface 108 and thus also overlaps the inside end segments of carbon segment-supporting parts 102 and the inside end surfaces of carbon segments 101. Furthermore, the intermediate spaces between hooked catch member base parts 109' are also filled with moldable plastic. After the adaptation of hub body 104, still, brush contact surface 108 is turned by means of a lathe insofar as is required and the free hooked catch member ends 109'' of hooked attachment catches 109 are formed.

In the third embodiment, shown in FIGS. 13 to 25, corresponding parts are once again indicated with the same references as in the first embodiment with addition of the number 200. The preferred range of use of the third embodiment is the same as for the embodiments described earlier.

Figure 13:
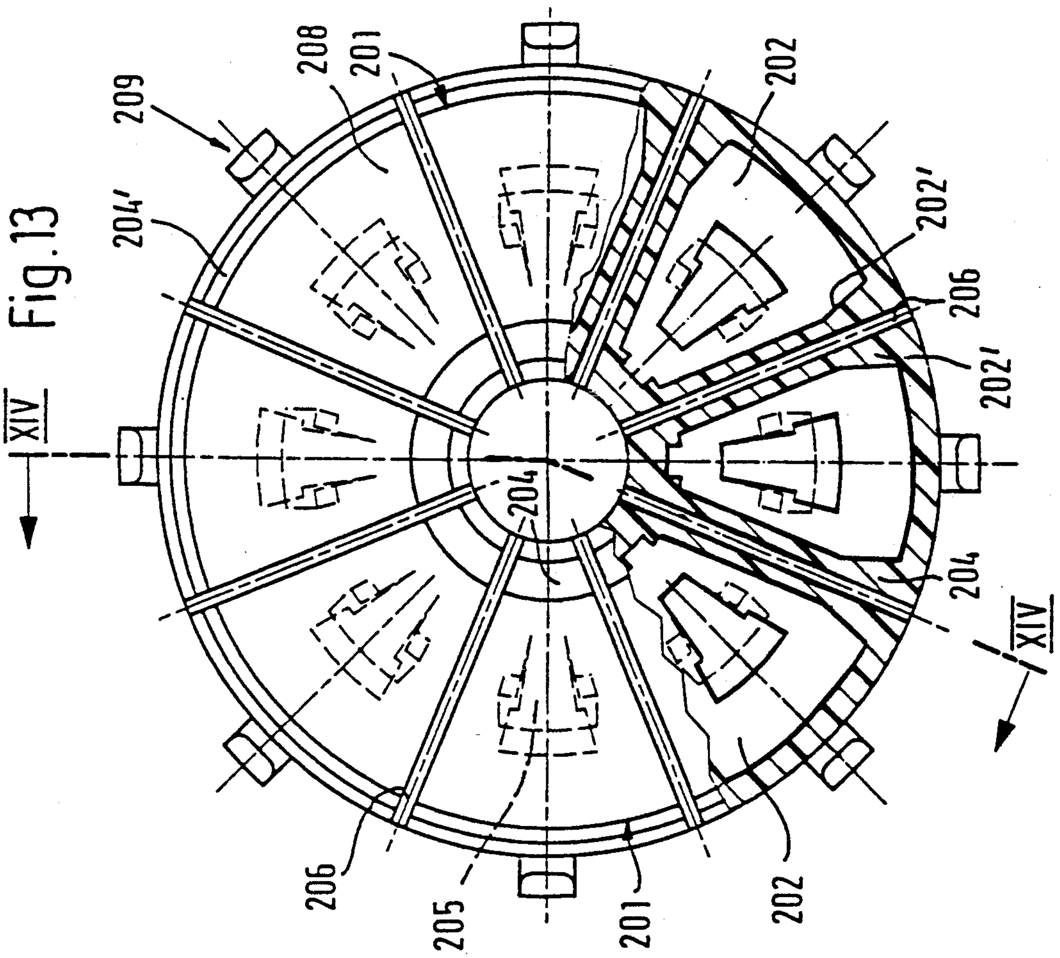
FIG. 13 is a partial cross section of a plan view of the working surface of a third exemplary embodiment incorporating the brush contact surface.
Figure 14:
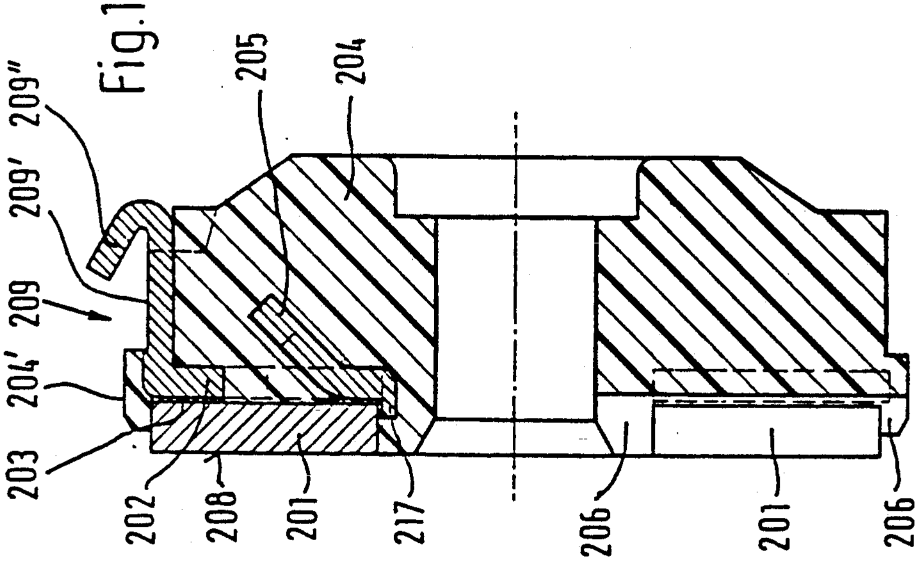
FIG. 14 is a cross section taken along line XIV—XIV of FIG. 13.
Figure 15:
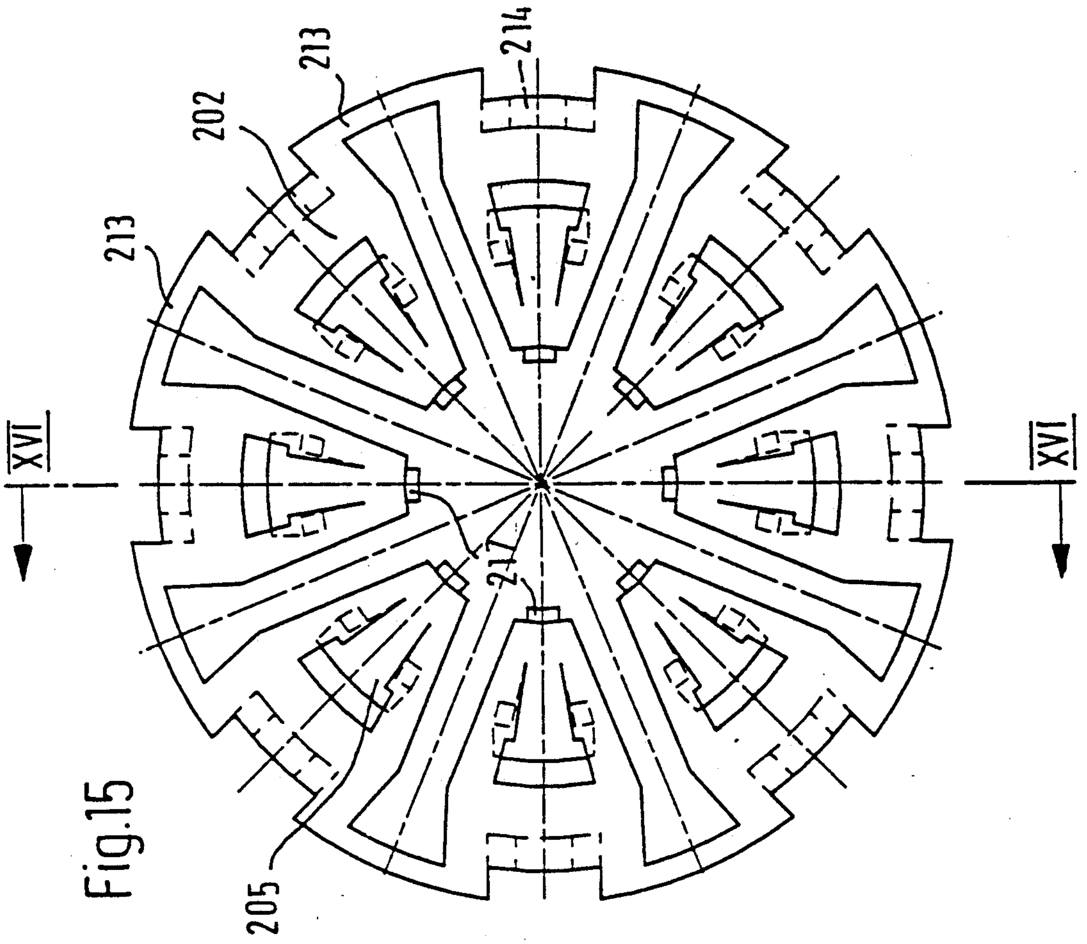
FIG. 15 is a frontal view of the body of the third embodiment forming the segment-supporting parts.
Figure 16:
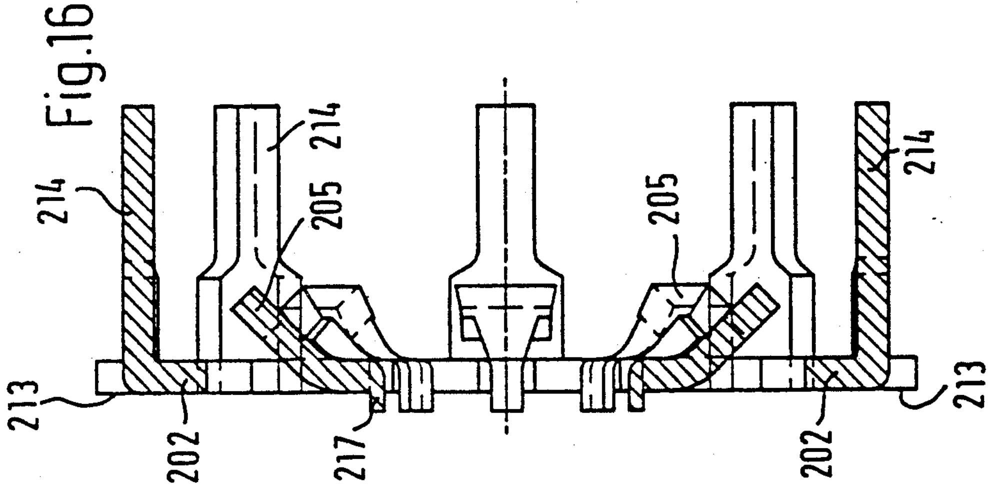
FIG. 16 is a cross section taken along line XVI—XVI of FIG. 15.
Figure 19:
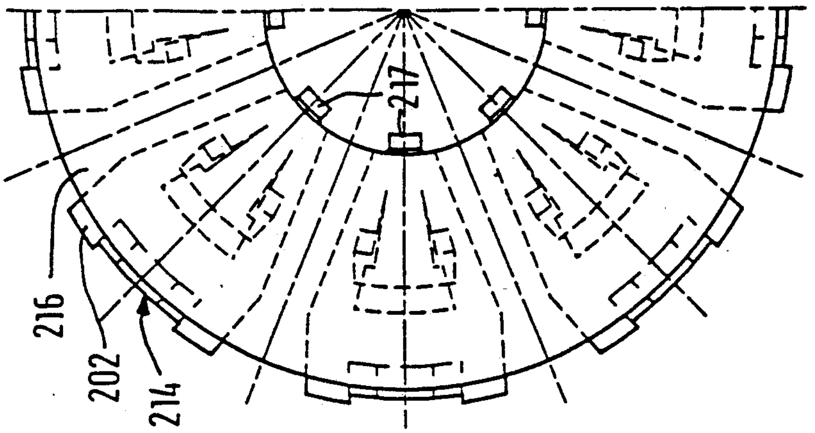
FIG. 19 is a partially represented frontal view of the annular plate of carbon material and of the carbon segment-supporting parts soldered with its reverse side.
Figure 18:
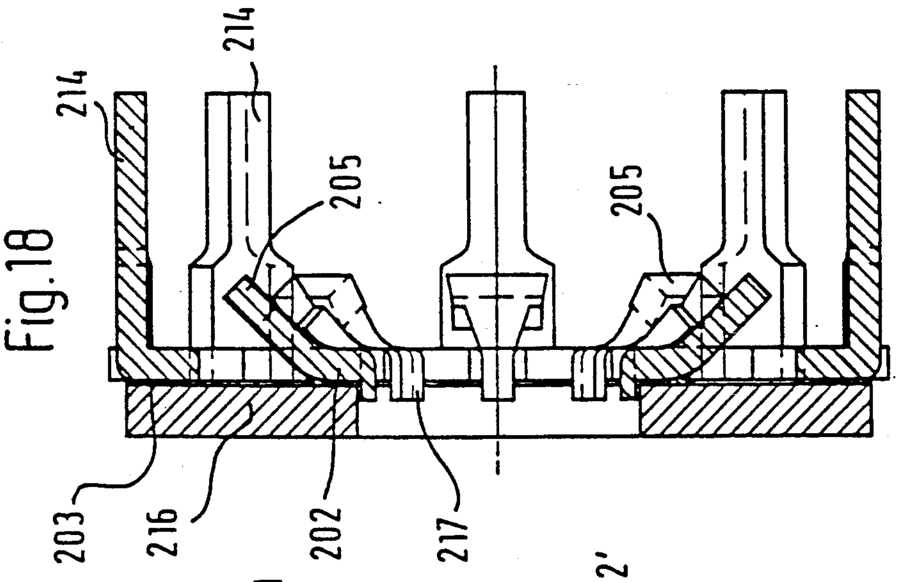
FIG. 18 is a cross section taken along lines XVIII—XVIII of FIG. 17.
Figure 17:
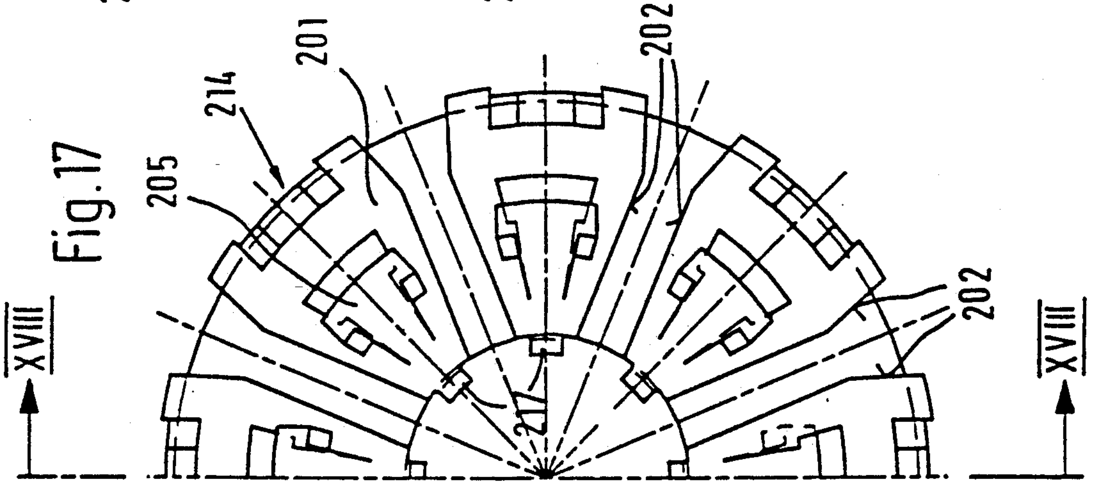
FIG. 17 is a partially represented plan view of the reverse side or side turned towards the hub of the body forming the segment-supporting parts following the soldering of the annular plate of carbon material and the removal of the connection parts between the segment-supporting parts.

The third embodiment differs from the first embodiment in that on their radially inward ends of segment-supporting parts 202 projecting over carbon segment 201 they each have an axially aligned tongue 217 and that hub body 204 by means of an annular material member 204' shields both the outside end surfaces of segment-supporting parts 202 and also a portion of the outside end surfaces of carbon segments 201. Solder layer 203, which connects carbon segments 201 with segment-supporting parts 202, is a soft solder. The connecting rods 213 are removed. Anchoring elements 205 have previously been bent into the arrangement shown in FIG. 18, so that they are embedded in hub body 204, when body 204 is formed of moldable plastic and is adapted to segment-supporting parts 202. As shown in FIG. 13, the intermediate clearance between side surfaces 202' of segment-supporting parts 202 is filled completely with moldable plastic. The moldable plastic also completely surrounds tongues 217 and extends as far as the plane defined by brush contact surface 208, whereupon the inside end surfaces of carbon segments 201 are likewise completely covered by the hub body. Furthermore the intermediate clearances between hooked catch member base parts 209' of hooked attachment catches 209 are completely filled with moldable plastic and the annular material portion 204' is formed. Carbon segment-supporting parts 202 are thus completely shielded by hub body 204, insofar as they are not shielded by carbon segment 201. Only the free hooked catch member ends 209'' and the outward pointing surfaces of hooked catch member base parts 209' remain free.

As in the exemplary embodiments described above the annular plate 216 is segmented following formation of hub body 104, and radial cuts are made, each cut forming one of the air gaps 206, which also penetrate slightly into the moldable plastic compound between side surfaces 202' of carbon segment-supporting parts 202, of which the spacing from one another is considerably greater than the width of air gap 206.

As shown in FIG. 20, the thickness of carbon segment 201 in the area of the outside edge can be reduced from the side forming brush contact surface 208 against the side connecting the solder layer 203, so that the annular material portion 204' can catch in behind carbon segment 201 in this case in a form-locking arrangement. A corresponding thickness reduction can likewise be provided on the inside edge of carbon segments 201, as shown in FIG. 22. As a result of this form-locking connection of carbon segments 201 in axial alignment with hub body 204, the arrangement prevents the movement of carbon segments 201 relative to carbon segment-supporting part 202 supporting them, even if the soft solder forming solder layer 203 should melt during soldering of the coil ends to the hooked attachment catch. The security of carbon segment 201 can also be attained or be improved by engagement of the hub body in a corrugation or the like running around the periphery and/or running axially relative to the outside and/or inside end surface. Melting of the solder can be counteracted in that hooked catch member base part 209' is of greater width along a part of its length around the periphery of the commutator than in the area of the free hooked catch member end, as shown in FIG. 7.

In order to couteract a sliding of carbon segment 201 in the direction of the rotation of the commutator in case of melting of the solder, it is possible, as shown further in FIG. 20, to provide the inside end surface of carbon segment 201 with an axial groove 218, in which engages the tongue 217. Instead of such a groove it is also possible to provide a corrugation. Correspondingly, the outside end surface of carbon segment 201 could also be provided with an axial groove or a corrugation for engagement of the moldable plastic compound of annular material portion 204', so that also the outside edge of carbon segment 201 is secured by a form-locking arrangement against sliding peripherally. Furthermore, as shown in FIG. 21, it is possible to shape the carbon segments in a dovetail, whereupon a form-locking connection likewise is produced in axial alignment between hub body 204 and carbon segments 201.

Another possibility for securing carbon segments 201 against sliding in the direction of the grain of the commutator is shown in FIG. 22. Carbon segments 201 in this embodiment are provided with a radial, groove-like recess 219 on their side facing segment-supporting part 202, into which engages an interlocking tongue 220 cut free from segment-supporting part 202 and flexed outward into carbon segment 201.

Figure 24:
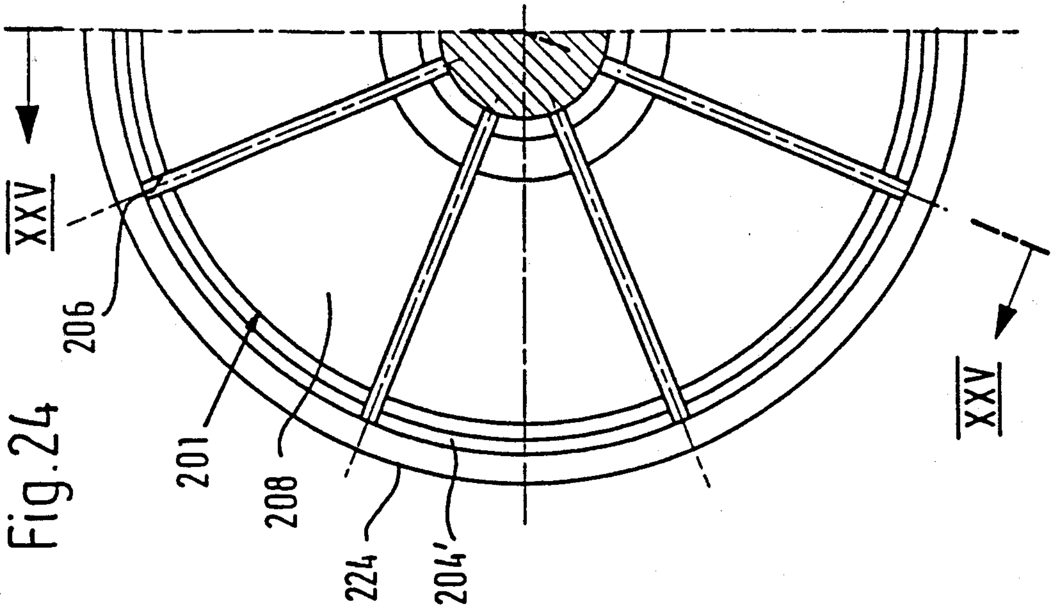
FIG. 24 is a plan view of the working side of the third embodiment forming the brush contact surface in assembled and connected state.
Figure 25:
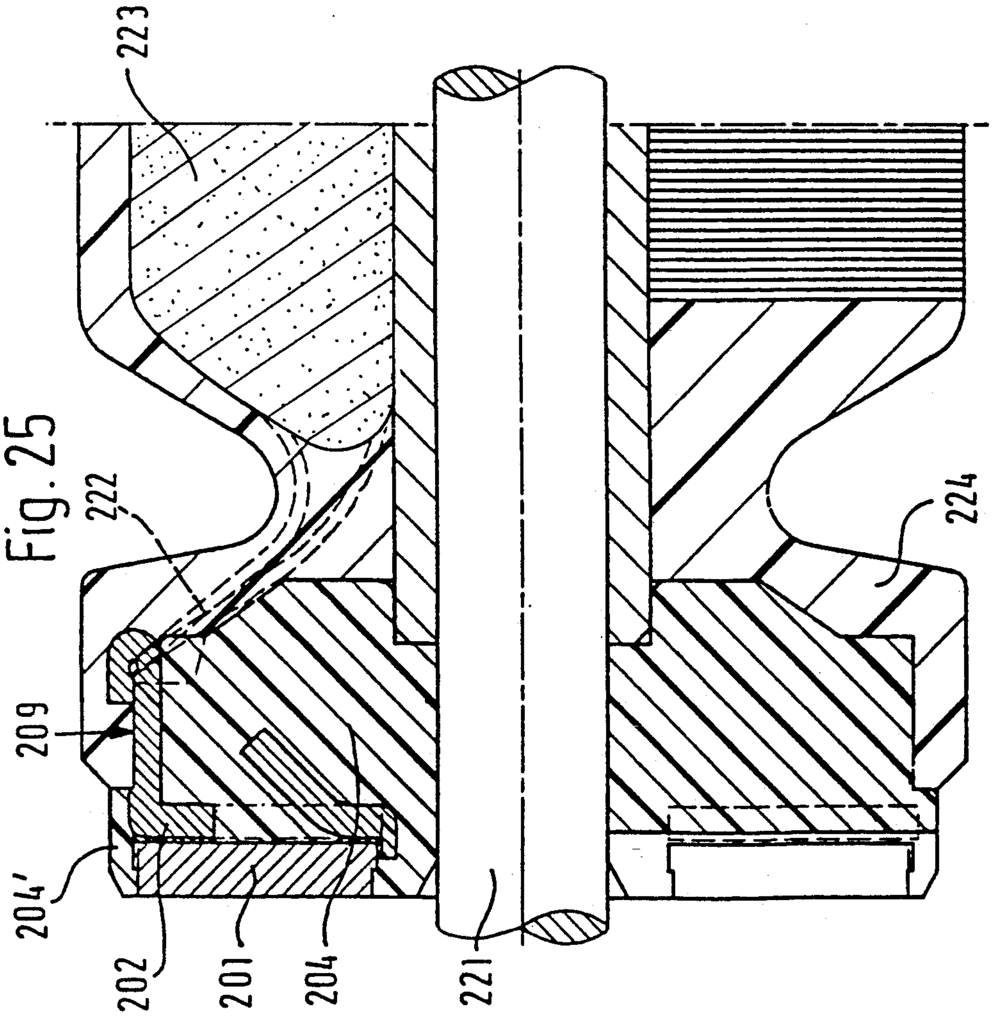
FIG. 25 is a cross section taken along line XXV—XXV of FIG. 24.

As shown in FIGS. 24 and 25, following the mounting of the commutator on the motor shaft 221 and the attachment of coil ends 222, it is also possible to spray the coil heads 223, the coil ends 222 and the commutator overall and completely until the annular material portion 204' with an insulating material 224. Segment-supporting parts 202 and hooked attachment catch 209 are then completely protected with plastic.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A flat commutator comprising:

a) plate-like carbon segments forming a brush contact surface, arranged at some distance from one another;

b) metallic, likewise separated segment-supporting parts for the carbon segments, which are each connected mechanically securely and electrically conductively with one of the segment-supporting parts;

c) a hub body of an electrically insulating moldable plastic which supports the segment-supporting parts, which are provided with anchoring elements and also coil attachment elements embedded in the hub body;

d) a solder connecting layer between the carbon segments and the segment-supporting parts; and e) said segment-supporting parts having facing end surfaces which are covered completely by said moldable plastic of the hub body.

2. Flat commutator as in claim 1, having a central through-passage channel and said end surfaces wherein the end surfaces of the segment-supporting parts include inside end surfaces turned in toward the central through-passage channel of the hub body and include an outside end surface of each segment-supporting part turned away from the central through-passage channel, wherein further at least one of said outside and inside end surfaces is at least partially covered by the moldable plastic of the hub body.

3. Flat commutator as in claim 2, wherein the moldable plastic of the hub body at least partially covers one of an inside end surface of each carbon segment turned toward a central through-passage channel and an outside end surface turned away from the central through-passage channel.

4. Flat commutator as in claim 1, wherein each of said segment-supporting parts have an intermediate space between facing side surfaces, which space is greater than the space between the carbon segments supported by directly adjacent said segment-supporting parts.

5. Flat commutator as in claim 4, wherein each space is an air gap between two adjacent carbon segments and extends a short distance into the moldable plastic of the hub body, which separates the segment-supporting parts.

6. Flat commutator as in claim 1, wherein the segment-supporting parts project radially outward over the outside edges of the carbon segments and here incorporate a segment from which extends an edge forming an installation surface for an outside end surface of each carbon segment and in an opposite direction a hooked catch member base of a hooked attachment catch member serving as attachment element.

7. Flat commutator as in claim 1, wherein the segment-supporting parts project radially inward over the carbon segments and in this projecting area have a material portion projecting outward against a plane defined by the brush contact surface preferably in a form of a tongue, to which is engaged an inside end surface of each carbon segment, preferably under an intermediate layer in a form of a solder layer.

8. Flat commutator as in claim 7, wherein the material portion engages in a groove of the carbon segment.

9. Flat commutator as in one of claims 6 or 7, wherein each of the material portions forming an installation surface for the inside end surface of the carbon segments and the installation surface for the outside end surface of the carbon segment, in axial alignment and aligned in a direction of rotation of the commutator, have teeth and tooth-size gaps, which engage with corresponding said teeth and tooth-size gaps of the carbon segments.

10. Flat commutator as in claim 1, wherein each segment-supporting part and each carbon segment supported by it, on their sides facing each other in a direction of rotation of the commutator have form-locking connection elements meshing together, preferably in a form of a projection and a recess receiving said projection.

11. Flat commutator as in claim 1, wherein the carbon segments with the help of the moldable plastic of the hub body are connected form-locking with the hub body and at least one of the segment-supporting parts.

12. Flat commutator as in claim 11, wherein the outside and inside end surfaces of each carbon segment are provided with corrugations running peripherally and axially.

13. Flat commutator as in claim 1, wherein each carbon segment, on a side forming the brush contact surface in the area of one of its inside and outside edges has a channeled area, into which projects a portion of a material of the hub body catching in each carbon segment.

14. Flat commutator as in claim 6, wherein the hooked catch member base of each hooked attachment catch member is configured at least over a portion of its axial length in peripheral alignment with the commutator to be wider than a free hooked catch member end attaching thereto.

15. Flat commutator as in claim 6, wherein each hooked catch member base is embedded in the hub body and together with this body forms a cylindrical outside sheathing surface.

16. Flat commutator as in claim 1, further including anchoring elements formed by portions which are cut free and flexed outward from a material of the segment-supporting parts, said anchoring elements are enlarged peripherally out toward their free ends.

17. Flat commutator as in claim 1, wherein the solder connecting layer is selected from the group consisting of a low melting point silver solder, and a soft solder.

18. Flat commutator as in in claim 1, wherein each carbon segment is connected in a form-locking connection with at least one of components taken from the group consisting of the segment-supporting parts and the hub body.

19. Flat commutator as in claim 1, wherein a gap is provided between each part of said carbon segments arranged directly adjacent each other.

* * * * *

UNITED STATES PATENT AND TRADEMARK OFFICE

CERTIFICATE OF CORRECTION

PATENT NO. : 5,157,299

DATED : October 20, 1992

INVENTOR(S) : Karl-Heinz GERLACH

It is certified that error appears in the above-identified patent and that said Letters Patent is hereby corrected as shown below:

Column 10, claim 11, line 31, after "with" insert --at least one of--;

claim 11, line 32, delete "at least one of".

Signed and Sealed this

Thirtieth Day of November, 1993

Attest:

Bruce Lehman

BRUCE LEHMAN

Attesting Officer

*Commissioner of Patents and Trademarks*